United States Patent
Shomura et al.

(10) Patent No.: US 9,319,910 B2
(45) Date of Patent: Apr. 19, 2016

(54) COMMUNICATION SYSTEM

(71) Applicant: HITACHI, LTD., Tokyo (JP)

(72) Inventors: Yusuke Shomura, Tokyo (JP); Koji Wakayama, Tokyo (JP); Ryouichi Tanaka, Tokyo (JP); Tsuyoshi Kajita, Tokyo (JP); Seiya Kudo, Tokyo (JP)

(73) Assignee: HITACHI, LTD., Tokyo (JP)

( * ) Notice: Subject to any disclaimer, the term of this patent is extended or adjusted under 35 U.S.C. 154(b) by 280 days.

(21) Appl. No.: 14/010,223

(22) Filed: Aug. 26, 2013

(65) Prior Publication Data

US 2014/0064136 A1 Mar. 6, 2014

(30) Foreign Application Priority Data

Aug. 30, 2012 (JP) .................................. 2012-189378

(51) Int. Cl.
*H04L 12/26* (2006.01)
*G06F 15/16* (2006.01)
*H04W 24/08* (2009.01)

(52) U.S. Cl.
CPC .................................... *H04W 24/08* (2013.01)

(58) Field of Classification Search
USPC ........................................................ 370/253
See application file for complete search history.

(56) References Cited

U.S. PATENT DOCUMENTS

| | | | | |
|---|---|---|---|---|
| 6,807,156 B1 * | 10/2004 | Veres | ................... | H04L 41/5067 370/252 |
| 2004/0093403 A1 * | 5/2004 | Toyama | ................... | H04L 12/26 709/223 |
| 2008/0101227 A1 * | 5/2008 | Fujita | ...................... | H04L 45/12 370/232 |
| 2009/0305684 A1 * | 12/2009 | Jones | ...................... | H04L 63/20 455/418 |
| 2010/0177650 A1 * | 7/2010 | Wittgreffe | ................. | H04J 3/14 370/252 |
| 2014/0059678 A1 * | 2/2014 | Parker | ..................... | H04L 63/20 726/22 |

FOREIGN PATENT DOCUMENTS

JP 2011-124750 A 6/2011

OTHER PUBLICATIONS

Japanese Office Action received in corresponding Japanese Application No. 2012-189378 dated Dec. 1, 2015.
Ogishi, T. et al., "Proposal of Methodology to Analyze Network Quality for Aggregated Paths Using Passive Traffic Measurement", The Institute of Electronics, Information and Communication Engineers, pp. 75-82, vol. 101 No. 186, Japan.

* cited by examiner

*Primary Examiner* — Edan Orgad
*Assistant Examiner* — Sithu Ko
(74) *Attorney, Agent, or Firm* — Mattingly & Malur, PC

(57) ABSTRACT

A communication system includes a mobile terminal, a base station, a first gateway device, a second gateway device, a flow measurement server, a quality management server, and an operational terminal. A predetermined flow is extracted by a quality management server, and the extracted flow is summarized for each communication path. A distribution of the communication quality of the flow for each communication path is displayed on a display unit of the operational terminal.

18 Claims, 12 Drawing Sheets

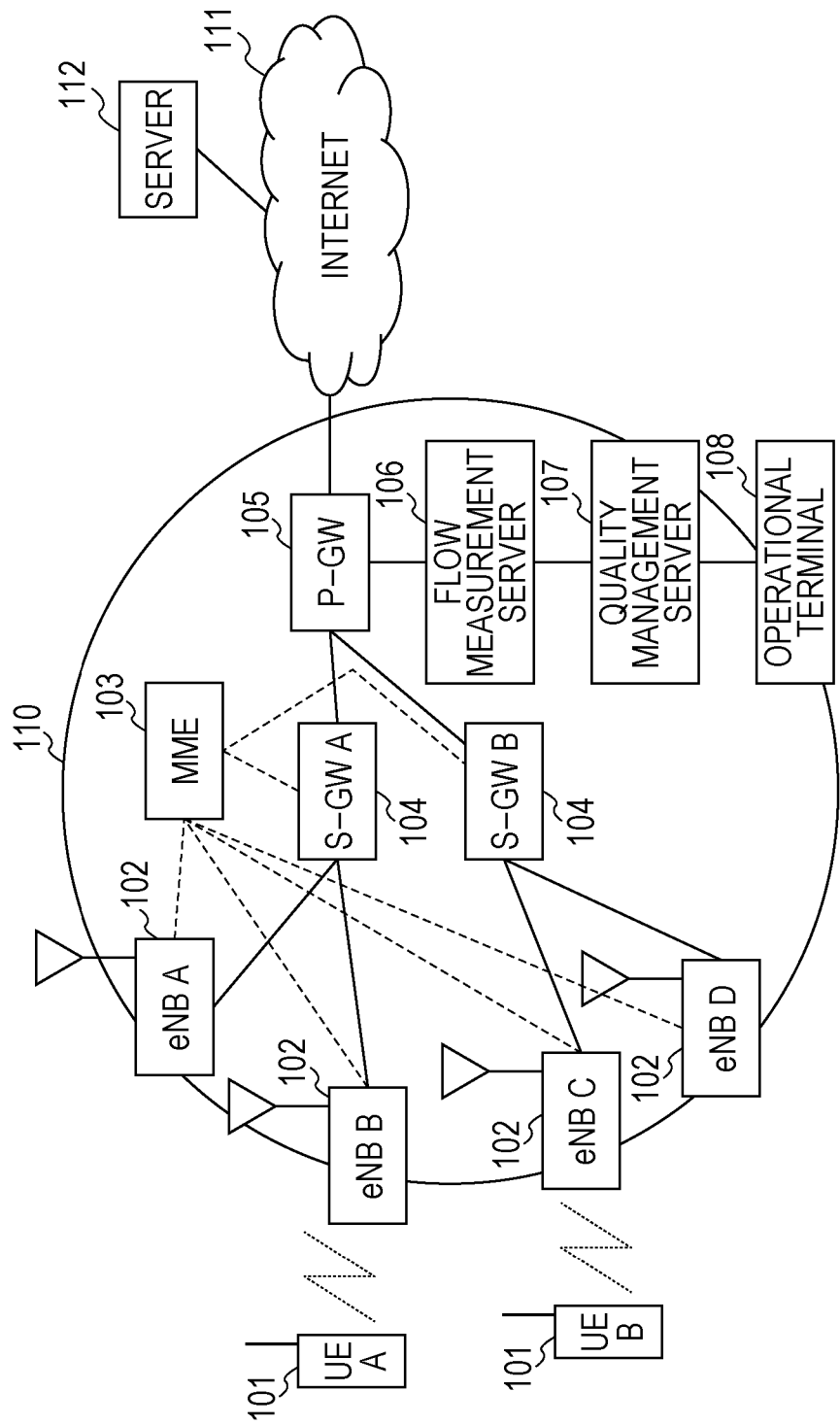

| ENTRY NUMBER | FLOW IDENTIFICATION INFORMATION 302 | | | | | | | |
|---|---|---|---|---|---|---|---|---|
| 301 | IP HEADER INFORMATION | | | | | NW INFORMATION | | |
| | UE_IP | UE_Port | Server IP | Server Port | PRT | imsi | eNB ID | S-GW IP | P-GW IP |
| | A | X | | | | | | | |
| | B | Y | | | | | | | |
| | ... | ... | | | | | | | |
| | 311 | 312 | 313 | 314 | 315 | 316 | 317 | 318 | 319 |

303

| STATISTIC INFORMATION | | | | | | | |
|---|---|---|---|---|---|---|---|
| NUMBER OF PACKETS | | NUMBER OF BYTES | | ELAPSED TIME | | TIME | |
| UPSTREAM | DOWNSTREAM | UPSTREAM | DOWNSTREAM | DURATION TIME | TT10K | TT1M | start_time | end_time |
| s11 | r11 | | | | | | | |
| s12 | r12 | | | | | | | |
| ... | ... | | | | | | | |
| 321 | 322 | 323 | 324 | 325 | 326 | 327 | 328 | 329 |

FIG. 4

| ID | EXTRACTION CONDITION | | |
|---|---|---|---|
| | SERVER IP | SERVER PORT | OTHERS |
| 1 | 192.168.0.1 | 80 | * |
| 2 | 192.168.2.2 | 8080 | * |
| | | | |

FIG. 6

| ID | EVALUATION CONDITION ||| EVALUATION RESULT |||||  NUMBER OF CORRESPONDING FLOWS |
| --- | --- | --- | --- | --- | --- | --- | --- | --- |
| | MEASUREMENT START TIME | MEASUREMENT PERIOD (sec) | EVALUATION SITE | EVALUATION ITEM | min | 1/4 | 1/2 | 3/4 | Max | |
| 1 | 2012/01/01 10:11:11.000 | 300 | eNB1 | WEB ACQUISITION (sec) | 0.1 | 0.5 | 1.2 | 2.2 | 5.2 | 123 |
| 2 | 2012/01/01 10:11:11.000 | 300 | eNB2 | WEB ACQUISITION (sec) | 0.2 | 0.3 | 1.0 | 2.1 | 4.7 | 159 |
| | | | | | | | | | | |

FIG. 10

| | 1101 | 1102 | 1103 |
|---|---|---|---|
| | ID | imsi | CLASS |
| | 1 | 012345678901234 | a |
| | 2 | 012345678901235 | b |
| | | | |

COMMUNICATION SYSTEM

CLAIM FOR PRIORITY

The present application claims priority from Japanese patent application JP 2012-189378 filed on Aug. 30, 2012, the content of which is hereby incorporated by reference into this application.

BACKGROUND OF THE INVENTION

1. Field of the Invention

The present invention relates to a system and method for evaluating communication quality of a mobile terminal in a mobile communication network.

2. Description of the Related Art

In the field of a mobile communication network, generally, a high-performance mobile terminal called a smart phone or a personal computer (PC) accesses the Internet via such a high-speed broadband network as a high-speed broadband mobile communication, e.g., a high speed packet access (HSPA) or evaluation-data optimized (EV-DO) as a 3rd generation (3G) high-speed data communication service and worldwide interoperability for microwave access (WiMAX) or long-term evolution (LTE) as a 3.9G high-speed data communication service. As a mobile communication network becomes widely spread, demands for high communication quality increase, so that a mobile communication service provider is requested to monitor communication quality and improve a poor quality area. Since the number of base stations also increases in order to handle an increasing traffic amount, it is necessary to efficiently check communication quality in each base station.

Presently, for communication quality management in a mobile communication network, a check is performed by estimating a congestion state and thus communication quality is based on a link occupation rate. However, it has been difficult to accurately check communication quality because a relationship between the link occupation rate and the quality such as a file transfer time or a throughput actually sensed by a user is not known.

For directly checking the communication quality, there is known an active measurement technique in which information such as a communication delay, a packet loss, and a throughput is obtained by actively transmitting and/or receiving a test packet. However, in such a technique, it is necessary to transmit and/or receive the test packet by installing a test packet transceiver in both entrance and exit sides of a monitoring target network, so that a measurement unit cost increases. In addition, since extra traffic is added to a network due to the test traffic in order to transmit the test packet to a network, there is a problem that network quality itself is degraded.

As one technique other than active measurement, there is known a passive measurement technique in which a network condition is checked by capturing and analyzing a packet passing through a portion where end-to-end traffic to be looked at flows.

For example, a communication quality measurement method is described in JP 2011-124750 A, which discloses a method for estimating network communication quality by measuring a round-trip time (RTT) using a SYN packet and a SYN+ACK or ACK packet.

SUMMARY OF THE INVENTION

As a means for obtaining communication quality, there is known a method for using flow measurement as a passive measurement technique. As the method for using flow measurement, JP 2011-124750 A discloses a method estimating network quality by measuring the RTT. However, it fails to discuss an index such as a file transfer time or a throughput close to a value actually sensed by a user.

In a mobile communication network, it is important to evaluate and visualize communication quality of each base station or each communication path based on information close to a value actually sensed by a user. For this reason, it is necessary to compute such communication quality from information obtained through flow measurement. However, in this case, it is necessary to consider an application characteristic. This is because statistics for each flow obtained by performing flow measurement is influenced by the application characteristic, so that measurement accuracy of communication quality may be significantly degraded if the statistics for each flow are simply counted and used as the communication quality.

For example, Secure Shell (SSH) or WebSockets has been developed to maintain a session. Therefore, the flow occupies a small bandwidth usage and has a long flow duration time. For this reason, for example, in order to evaluate web browsing, it is necessary to exclude a flow relating to such an application. In addition, for example, in web browsing, small files are frequently downloaded. Therefore, each flow has a small download size and a short flow duration time. For this reason, due to an influence from a process relating to TCP connection establishment and the like, a throughput decreases. Consequently, it is difficult to improve accuracy of communication quality if web browsing is evaluated only using a throughput.

In view of the aforementioned problems, the present invention provides a method for evaluating communication quality based on information close to a value actually sensed by a user in consideration of an application characteristic and a system capable of implementing the same.

A summary of the major embodiments according to the present invention will be described below.

There is provided a communication system including: a flow measurement server; and a quality management server connected to the flow measurement server, wherein the flow measurement server computes a plurality of items of communication quality for each flow based on data flowing between a mobile terminal and a server, and the quality management server extracts a predetermined flow depending on each of the items of communication quality, summarizes the extracted flow for each communication path, and outputs a distribution of the communication quality for the each communication path.

According to the present invention it is possible to allow a network operator to check a network condition based on information close to communication quality information actually sensed by a user, such as a file transfer time or throughput, with high accuracy.

BRIEF DESCRIPTION OF THE DRAWINGS

FIG. 1 is an exemplary schematic configuration diagram illustrating a mobile communication system;

FIG. 3 is a diagram illustrating an exemplary flow table provided in a flow measurement server;

FIG. 4 is a diagram illustrating an exemplary measurement target list provided in the quality management server;

FIG. 6 is a diagram illustrating an exemplary communication quality table provided in the quality management server;

FIG. 10 is a diagram illustrating an exemplary UE attribute list provided in a quality management server according to a fourth embodiment.

DESCRIPTION OF THE PREFERRED EMBODIMENTS

First Embodiment

Figure 2A:
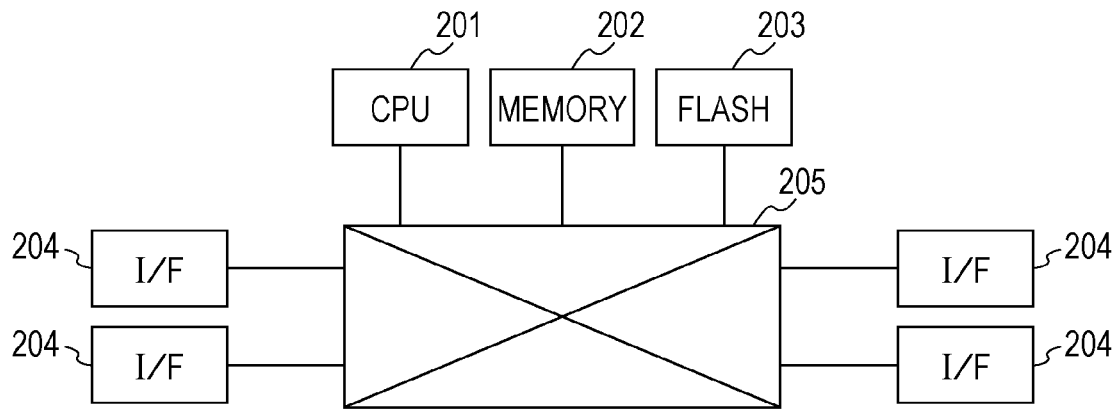
FIG. 2A is an exemplary configuration diagram illustrating hardware of a gateway.

In the embodiments described below, a representation such as the number of elements (including a number, a value, a range, and the like) is not intended to limit such a representation to a particular number, but may be equal to or greater than the particular number or may be equal to or smaller than the particular number, unless specified otherwise or apparently limited to a specific number in principle.

A first embodiment of the present invention will be described with reference to FIGS. 1 to 8.

FIG. 1 is a diagram illustrating a configuration of a mobile communication system. The present embodiment relates to an example applied to a long-term evolution (LTE) system called 3.9G. However, the invention may also be applied to other systems such as a worldwide interoperability for microwave access (WiMAX) or 3rd-generation (3G) system.

The mobile communication system includes a plurality of user equipment (UE) 101 and enhanced node-B (eNB) 102, a mobility management entity (MME) 103, serving gateways (S-GW) 104, a packet data network gateway (P-GW) 105, a flow measurement server 106, a quality management server 107, and an operational terminal 108.

The UE A 101 and the UE B 101 are mobile terminals. The eNB's 102 are base stations. The MME 103 is a mobile management server that performs terminal position management or authentication. The S-GW 104 is a first mobile gateway serving as an anchor point in a RAN (Radio Access Network). The P-GW 105 is a second mobile gateway serving as a border between a service network and a wireless network. The flow measurement server 106 is a server that holds flow statistics information of traffic flowing through the P-GW 105. The quality management server is a server that manages information relating to communication quality of a RAN 110. The operational terminal is a terminal operated by an operator.

Those devices are connected to each other via a network. Specifically, the UE A 101 and the UE B 101 are connected to the eNB B 102 and the eNB C 102, respectively, via a wireless network. In addition, the eNB A 102 and the eNB B 102 are connected to the S-GW A 104, and the eNB C 102 and the eNB D 102 are connected to the S-GW B 104. The S-GW A 104 and the S-GW B 104 are connected to the MME 103 and the P-GW 105. The P-GW 105 is connected to the Internet 111. The flow measurement server 106 is connected to the P-GW 105, and the quality management server 107 is connected to the flow measurement server 106. The operational terminal 108 is connected to the quality management server 107. The network connected to the flow measurement server, the quality management server, and the operational terminal serves as a management network for allowing a service provider to manage a network.

The RAN 110 is a network managed by a service provided which provides an LTE service. The Internet 111 is an external network that provides the mobile terminal 101 with a service.

In this configuration, a user packet generated by the UE A 101 arrives at the server 112 via the eNB B 102, the S-GW A 104, the P-GW 105, and the Internet 111. A response packet from the server 112 arrives at UE A 101 in a reverse order. That is, the eNB 102, the S-GW 104, and the P-GW 105 perform data communication switching between UE 101 and a server. Meanwhile, the flow measurement server 106 manages information on traffic flowing though the RAN 110 by organizing data flowing between UE 101 and a server into statistics information on a flow basis. Here, the flow means a data group organized for each set of end points that transmit and/or receive data, that is, a set of UE 101 and the server 112. In order to more specifically analyze data, TCP/UDP ports of UE 101 and the server 112 may be used as the end point, and the flow may include a set of five items including an IP address of UE, an IP address of a server, a protocol number, a TCP/UDP port number of UE, and a TCP/UDP port number of the server. In addition, the flow may be divided into a transmit direction and a receive direction and may be separately treated in the transmit-side and receive-side. The quality management server 107 analyzes and manages a communication quality status in a RAN based on the flow statistic information obtained from the flow measurement server.

Next, means for allowing the flow measurement server 106 to obtain traffic information flowing through the RAN 110 will be described. Here, the traffic information refers to information regarding data transmitted/received by UE 101 and a server, mainly information contained in a header. The traffic information contains information regarding a packet size and a flow, such as IP addresses of a source and a destination, an upper protocol, a TCP/UDP port number. In addition, other header values such as a type of service (TOS) may be contained. FIG. 1 illustrates an example in which mirroring of a flowing user packet is performed using the flow measurement server 106 in order to manage the RAN 110. The mirroring is a process of creating a duplicate of data input to and/or output from a device and outputting the duplicate of data to a predetermined port (mirroring port), e.g., outputting to server 106. The mirrored packet is a packet flowing between the P-GW 105 and the S-GW 104. Alternatively, mirroring to the flow measurement server 106 may be performed by arranging a network tap, not shown, between the P-GW 105 and the S-GW 104. The network tap is a device that splits a network signal and outputs input data to a plurality ports. Alternatively, the P-GW 105 or the S-GW 104 may collect statistics for each flow and transmit the collected flow statistics information to the flow measurement server. The statistics for each flow is transmitted to the flow measurement server using a protocol such as NetFlow or IPFIX.

The flow measurement server 106 creates, accumulates, and manages statistics information for each flow based on the traffic information received from P-GW 105. The process in the flow measurement server 106 will be described in detail with reference to FIG. 3.

The quality management server 107 obtains flow information from the flow measurement server 106 and computes communication quality information of a communication path, such as eNB 102, S-GW 104, P-GW 105, a communication interface (I/F) 204 of the P-GW 105, on a time basis to accumulate and manage the communication quality information. The process of quality management server 107 will be described in detail with reference to FIG. 4.

The operational terminal 108 obtains information relating to communication quality from the quality management server 107 based on an instruction from an operator and displays the information. The process of the operational terminal 108 will be described in detail with reference to FIGS. 8A and 8B, which show displays.

Although an LTE system is exemplarily described in FIG. 1, in a WiMAX system, an access service network gateway (ASN-GW) corresponds to the S-GW 104 or the MME 103, and a home agent (HA) corresponds to the P-GW 105. In a 3G system, a serving general packet radio service (GPRS) support node (SGSN) corresponds to the S-GW 104 or the MME 103, and a gateway GPRS support node (GGSN) corresponds to the P-GW 105.

FIG. 2A illustrates an exemplary configuration of the mobile gateway 104 or 105. The mobile gateway includes a central processing unit (CPU) 201, a memory 202, a nonvolatile memory 203, and a communication interface (I/F) 204. The mobile gateways are connected to each other through a switch processing unit 205.

The CPU 201 loads various programs stored in the nonvolatile memory 203 and the like in the memory 202 and executes the programs. The memory 202 stores the program loaded from the nonvolatile memory (flash memory) 203 and accesses the loaded program when the CPU 201 executes the program. The nonvolatile memory 203 is, for example, a flash memory and stores configuration information or a program executed by the CPU 201.

The interface (I/F) 204 receives a packet from a base station eNB 102 or another node, or transmits the packet processed by the CPU 201 to other nodes. The switch processing unit 205 connects the CPU 201, the memory 202, the nonvolatile memory 203, and the interface (I/F) 204 to transmit and/or receive data between such elements.

Figure 2B:
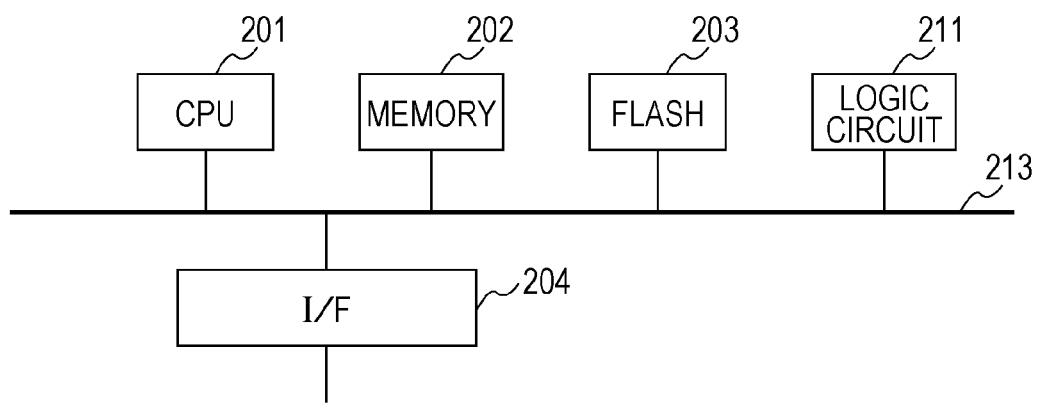
FIG. 2B is an exemplary configuration diagram illustrating hardware of a server.

FIG. 2B illustrates an exemplary configuration of the servers 106, 107, and 112 as a computer. The computer includes the central processing unit (CPU) 201, the memory 202, the nonvolatile memory (flash memory) 203, a logic circuit 211, and the communication interface (I/F) 204 connected to each other via a bus 213.

The logic circuit 211 is an electronic circuit that performs a logic operation process, and may include an application-specific integrated circuit (ASIC), a field programmable gate array (FPGA), a digital signal processor (DSP), a digital RF processor (DRP), and the like. Various programs executed by the computer are executed in cooperation with CPU 201, the memory 202, the nonvolatile memory 203, and the logic circuit 211. Naturally, it may be possible to appropriately change which of the logic circuit or the CPU is used to execute each functionality.

Figure 2C:
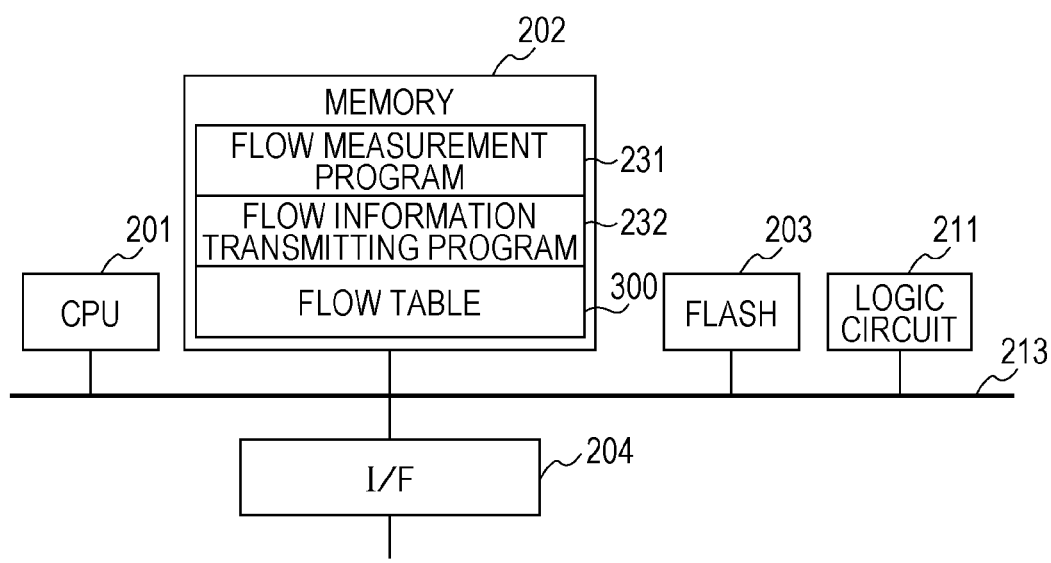
FIG. 2C is an exemplary configuration diagram illustrating hardware of a flow measurement server.

FIG. 2C illustrates an exemplary configuration of the flow measurement server 106. The flow measurement server 106 holds a flow measurement program 231, a flow information transmitting program 232, and a flow table 300 in the memory 202.

Figure 2D:
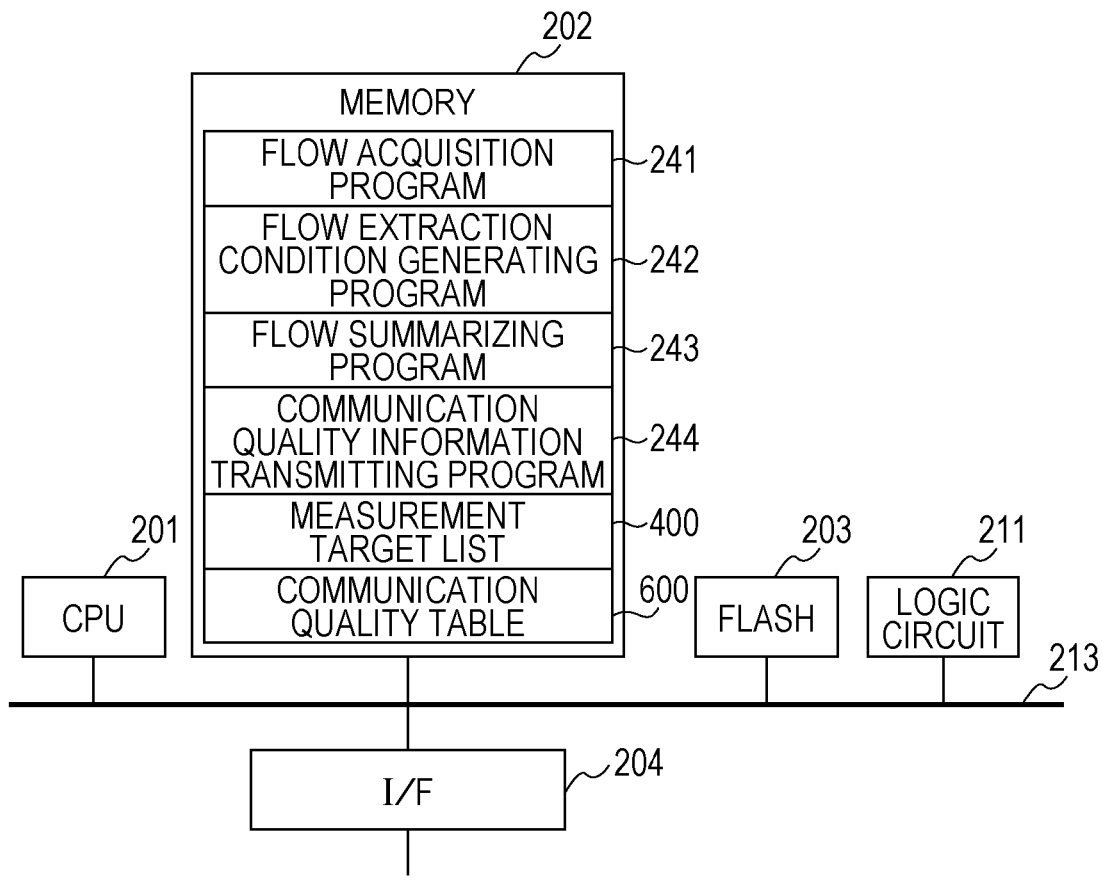
FIG. 2D is an exemplary configuration diagram illustrating hardware of a quality management server.

FIG. 2D is an exemplary configuration of the quality management server 107. The quality management server 107 holds a flow acquisition program 241, a flow extraction condition generating program 242, a flow summarizing program 243, a communication quality information transmitting program 244, a measurement target list 400, and a communication quality table 600 in the memory 202.

Figure 2E:
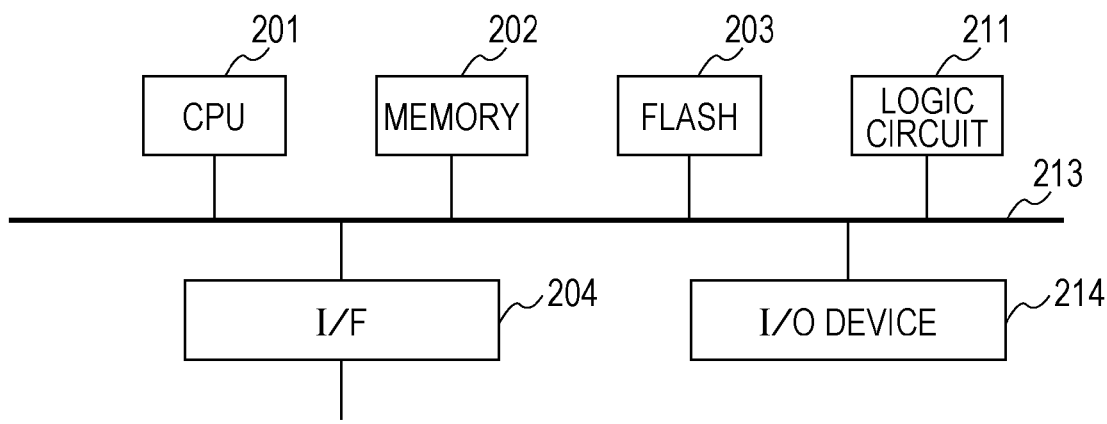
FIG. 2E is an exemplary configuration diagram illustrating hardware of an operational terminal.

FIG. 2E is an exemplary configuration of the operational terminal. In the operational terminal 108, an I/O device 214 such as a touch panel, a keyboard, a mouse, or a display unit may be connected to a bus in addition to the aforementioned computer configuration, and a user operates the operational terminal 108 using such a device.

Next, a functionality of the flow measurement server 106 will be described. The flow measurement server 106 holds the flow measurement program 231, the flow information transmitting program 232, and the flow table 300 in the memory 202. The CPU 201 organizes and manages the received traffic information into flow-based statistics information by executing the flow measurement program 231. The CPU 201 responds to a request for the flow statistics sent from the quality management server by executing the flow information transmitting program 232. Alternatively, the flow statistics information is sent in response to a timer and the like. Both programs are processed using the flow table 300 of FIG. 3.

The flow measurement program 231 is operated in response to receipt of traffic information sent from the P-GW 105. In this process, the statistics information of the flow in the flow table 300 is updated by specifying the flow of the traffic information.

The flow information transmitting program 232 is operated when a condition set in advance, e.g., through terminal 108, is satisfied or in response to receipt of the request for flow statistics information sent from the quality management server 107. The flow transmission condition includes a transmission trigger and a transmission flow condition. The transmission trigger is a condition such as when a flow having a certain condition is terminated, or when a certain time is reached. For example, the transmission flow condition is a condition of the flow serving as a transmission target such as "flow having Server_IP set to A." As a specific process, the flow statistics information matching the transmission flow condition included in the request of the flow transmission condition or the flow statistics information is obtained from the flow table 300 and is transmitted to the quality management server 107.

FIG. 3 illustrates an exemplary flow table 300 held by the flow measurement server 106. The flow table 300 contains an "entry number" column 301, a "flow identification information" column 302, and a "statistic information" column 303. The "entry number" column 301 stores an identifier that uniquely identifies a flow. The "flow identification information" column 302 contains a "network (NW) information" column and an "IP header information" column as information for identifying the flow.

The "IP header information" columns contains header information of the IP packet generated by a user and contains information such as UE_IP 311, UE_Port 312, Server_IP 313, Server_Port 314, and PRT 315. The "UE_IP" 311 stores an IP address allocated to UE. The "UE_Port" 312 stores an L4 port number of the UE side. The "Server_IP" 313 stores an IP address of a communication counterpart server. The "Server_Port" 314 stores an L4 port number of a communication counterpart server side. The "PRT" 315 stores a protocol included in the IP packet header.

The "NW information" column stores information such as a path where the flow passes. According to the present embodiment, for example, "imsi" 316, "eNB ID" 317, "S-GW IP" 318, and "P-GW IP" 319 are stored in the "NW information" column. The "imsi" 316 stores a unique identification number allocated to a mobile phone user and stored in a subscriber identification module (SIM) card of the mobile phone. An identifier for uniquely identifying eNB is stored in "eNB ID" 317. The "S-GW IP" 318 and the "P-GW IP" 319 refer to IP addresses allocated to S-GW and P-GW, respectively, and store IP addresses used in encapsulation with S-GW and P-GW.

As an exemplary method for obtaining each entry, an entry of the "imsi" 316 may be obtained by querying P-GW 105 or S-GW 104 by setting "UE_IP" 311 as a key. The "eNB ID" 317 may be obtained by querying S-GW 104 or MME 103 by setting a session ID added in encapsulation of S-GW 104 or P-GW 105 as a key. The "S-GW IP" 318 and the "P-GW IP" 319 may be obtained from the IP header added in encapsulation of S-GW 104 and P-GW 105. In addition, each entry of the "NW information" column may be obtained by obtaining a control packet flowing through the RAN, creating a lookup table for converting IP header information into NW information, and using the lookup table.

The "statistic information" column 303 includes a "number of packets" column, a "number of bytes" column, an "elapsed time" column, and a "time information" column. The "number of packets" columns 321 and 322 and the "number of bytes" columns 323 and 324 store integral values of the number of packets and the number of bytes included in the corresponding flow depending on a communication direction. The "upstream" refers to traffic from UE to the server, and the "downstream" refers to traffic from the server to UE. The "elapsed time" column stores time elapsing until a predetermined number of bytes or a predetermined number packets are received, such as a flow duration time 325, time TT10K 326 elapsing until UE 101 receives 10 Kbytes, or time TT1M 327 elapsing until UE 101 receives 1 Mbytes. The "time" column stores time when a packet satisfying a certain condition, such as a packet for asserting a SYN+ACK flag, is received in addition to a start time 328 and an end time 329 of the flow. In addition, as described below, a network throughput is computed and stored for each flow using an integral value of the number of bytes or the duration time.

In addition, a field representing a status of the flow may be provided in the flow table. For example, the field may include information indicating a fact that the flow is in the process or is terminated using a FIN packet.

Subsequently, the quality management server 107 will be described. First, description will be made for the communication quality information generated by the quality management server 107 and then each functionality of the quality management server 107. According to the present embodiment, the communication quality information is evaluated using a file transfer time and a throughput (bent portions) actually sensed by a user. Specifically, evaluation is made using the file transfer time in a case where a small file is received. Otherwise, evaluation is made using the throughput when a large file is received. That is, when the communication quality is evaluated using the file transfer time, at least one of a flow having time necessary to receive a predetermined number of packets or a predetermined number of bytes or a flow for downloading data equal to or smaller than a predetermined number of packets or a predetermined number bytes is extracted. Meanwhile, when the communication quality is evaluated using a network throughput, a flow having the number of packets or the number of bytes larger than a predetermined value is extracted.

This classification is obtained by assuming a user's condition. The file transfer time means time elapsing until a page is displayed when a user browses the web, and the throughput is obtained by assuming a transmission rate when a large file is downloaded.

Evaluation is made either for the file transfer time or the throughput depending on a file size because a throughput bps (bytes per second) of a small file decreases due to an influence of a process for establishing a transmission control protocol (TCP) connection or a slow start of TCP. That is, if only the throughput is used, evaluation may also be influenced by a protocol overhead in addition to the network quality, so that the communication quality may seem worse than an actual value. Meanwhile, if evaluation is made using the file transfer time, a session hold time of a large file and the file transfer time increases, so that communication quality may seem worse than an actual value.

According to the present embodiment, evaluation using the file transfer time is performed mainly for time elapsing until a small file of 1 to 10 Kbytes is obtained based on quality information obtained by assuming web browsing. In many cases, a typical homepage contains a set of small files such as hypertext markup language (html) files, cascading style sheets (css) files, script files, and image files. For this reason, at the time of web browsing, there is a tendency that a flow for obtaining a file of about 10 Kbytes is frequently generated. Therefore, it is possible to obtain information close to the quality actually sensed by a user in web browsing by observing a distribution of time necessary to obtain a file having a size of about 1 to 10 Kbytes. Here, a file acquisition time may be obtained using "TT10K" of the statistic information or a duration time of the flow used to download data equal to or smaller than 10 Kbytes. Alternatively, "min (TT10K, flow duration time)" may be used as the file transfer time. In a case where a file size of the homepage increases and the number of downloads per flow increases in the future, that is, in a case where a flow having the number of bytes greater than 10 Kbytes in download is frequently generated, "TT10K" may be substituted with "TT100K."

Next, evaluation using the throughput is performed for quality information at the time of downloading a large file by assuming a network throughput (bps) when a file having a size of a predetermined number of bytes or more, such as 1 Mbytes, is obtained. In the TCP protocol, a network throughput does not increase when a small file is downloaded due to an influence of an overhead caused by a-way handshake or a slow start algorithm. Therefore, it is possible to measure quality of a communication path with high accuracy by limiting the measurement target to a flow having a large download file size. The throughput may be obtained using a formula (integral value of the number of bytes/duration time) or (900 Kbytes/(TT1M−TT100K)).

The functionality of the quality management server 107 will be described. The quality management server 107 holds the flow acquisition program 241, the flow extraction condition generating program 242, the flow summarizing program 243, the communication quality information transmitting program 244, the measurement target list 400, and the communication quality table 600 in the memory 202.

The flow information is obtained from the flow measurement server 106 by causing the CPU 201 to execute the flow acquisition program 241. An extraction condition of the flow suitable for visualization is created by causing the CPU 201 to execute the flow extraction condition generating program 242. The extracted flow is summarized for each communication path, and a distribution of the flow statistic information is created for each communication path by causing the CPU 201 to execute the flow summarizing program 243. A response to the request for the communication quality information sent from the operational terminal is performed by causing the CPU 201 to execute the communication quality information transmitting program 244.

The flow acquisition program 241 is operated when an acquisition request for the flow statistic information is generated, such as when there is a request from the operational terminal 108, or when the flow extraction condition is generated. The acquisition request includes a transmission flow condition where a condition of the necessary flow statistic information is recorded.

Figure 4:
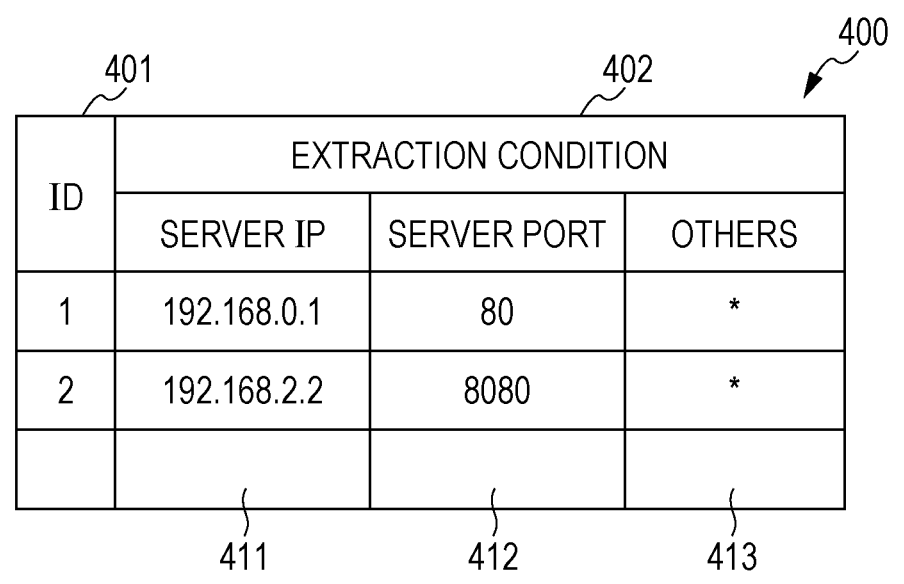

The flow extraction condition generating program 242 has a functionality of generating the measurement target list 400 of FIG. 4 and is executed regularly or when the measurement target list 400 is empty. The measurement target list 400 is prepared for each evaluation item including the file transfer time evaluation and the throughput evaluation and stores a condition of the flow suitable for each evaluation. The measurement target list generating process for each evaluation is illustrated in FIG. 5.

FIG. 4 illustrates an exemplary measurement target list 400 held by the quality management server 107. The measurement target list 400 includes an "ID" column 401 and an "extraction condition" column 402. The "ID" column 401 stores an identifier for uniquely identifying the "extraction condition" 402. The "extraction condition" column 402 stores a condition of the flow used to evaluate quality, and includes "Server_IP" 411, "Server_Port" 412, and "Others" 413. The "Server_IP" 411 and the "Server_Port" 412 are conditions of the "Server_IP" 313 and the "Server_Port" 314, respectively, of the flow table 300. Using information of "Others" 413, conditions for items other than "Server_IP" 411 and "Server_Port" 412 contained in the flow table are specified.

The measurement target list 400 is used to extract a flow suitable for each evaluation when the flow summarizing program 243 is executed. Using the measurement target list 400, it is possible to effectively extract the flow suitable for each evaluation.

Figure 5:
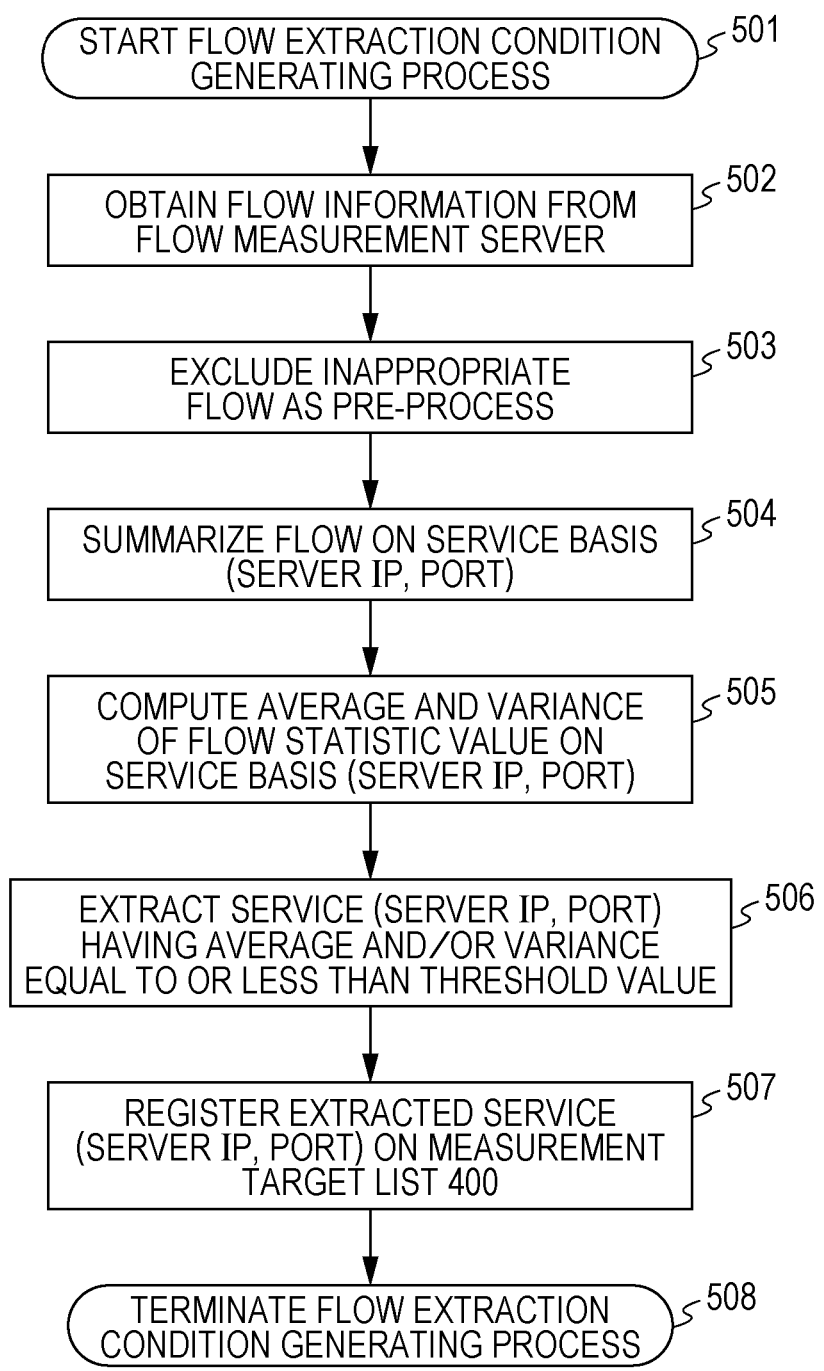
FIG. 5 is a flowchart illustrating operations made when the quality management server generates a flow extraction condition.

FIG. 5 is a flowchart illustrating the flow extraction condition generating program 242. In a flow extraction condition generating process, first, information on overall flows flowing from the flow measurement server for a certain recent period is obtained (step 502). Then, an inappropriate flow is excluded from the obtained flows (step 503). Here, the inappropriate flow is, for example, a flow having only an upstream packet or a downstream packet, or a flow whose the number of transmitted bytes is equal to or smaller than a certain value in a case where communication quality is evaluated using the throughput. A file size such as the number of transmitted bytes may be referenced from the "statistic information" of the flow table of FIG. 3. Alternatively, a condition such as a reason of terminating a TCP session may be added. Then, the flows are organized on a service basis, that is, for each set of "Server_IP" and "Server_Port" (step 504). Here, the next step is executed by excluding a service having a small number of flows. Subsequently, an average or a variance of the flow statistic value is computed on a service basis (step 505). The flow statistic value refers to "TT10K," "flow duration time," or "min (TT10K, flow duration time)" in a case where evaluation is performed using the file transfer time. The flow statistic value refers to a network throughput (bps or pps) computed from the statistic information in a case where the evaluation is performed using the throughput. In addition, a service (a set of "Server_IP" and "Server_Port") having an average, a variance, or both of them computed in step 505 equal to or smaller than a threshold value is extracted (step 506), and the extracted set of "Server_IP" and "Server_Port" is registered in the measurement target list 400 (step 507). Then, the process is terminated (step 508).

It is possible to effectively exclude, for example, a flow relating to a service for maintaining a session such as SSH by extracting a service having a low average. In addition, it is possible to effectively exclude a service having a significantly fluctuating server processing time by extracting a service having a low variance. That is, if a service having a low average/variance is extracted, it is possible to evaluate only an influence of a communication path by evaluating communication quality based on the flow having a constant service and a constant server response.

If communication quality is obtained by executing the aforementioned process, it is possible to suppress an influence of a communication counterpart server in addition to an influence of an application characteristic to the minimum.

Figure 7:
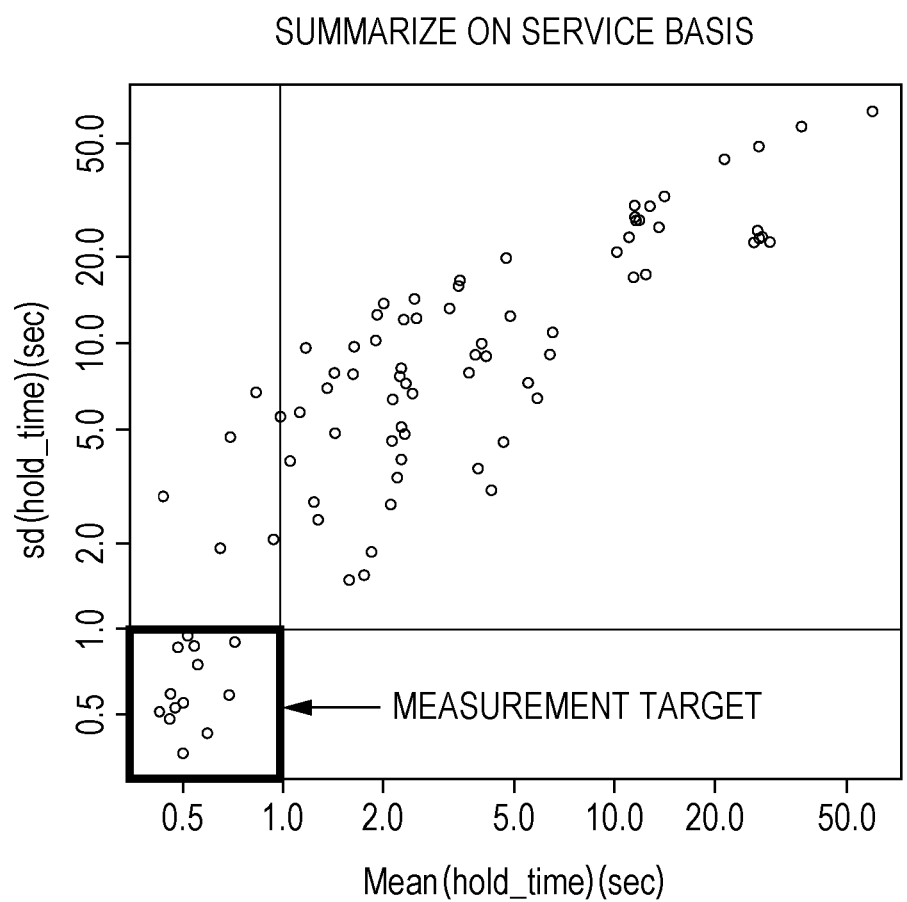
FIG. 7 is an explanatory diagram illustrating a condition for extracting a flow used to measure communication quality.

FIG. 7 is a diagram obtained by plotting an average/variance of the flow statistic value organized on a service basis and computed in step 505. FIG. 7 is a diagram obtained by performing evaluation using the file transfer time, in which the abscissa denotes an average of the flow duration time (file transfer time), and the ordinate denotes a standard deviation of the flow duration time. As recognized from FIG. 7, the flow duration time, that is, the file transfer time is significantly deviated depending on a service.

In a case where a web server is running for evaluating communication quality in active measurement, an IP address and a port number of the web server may be directly and manually input to the measurement target list 400. If a web server for active measurement is added to the extraction target, it is possible to treat communication quality information obtained through active measurement and communication quality information obtained through passive measurement in an integrated manner.

The flow summarizing program 243 is regularly executed to create the communication quality table 600 of FIG. 6 based on the flow matching the measurement target list 400. Using the communication quality table 600, it is possible to provide desired data to a request from a user. Summarization for each communication path is performed using the "NW information" of the flow table. For example, in a case where summarization is performed for each eNB 102, summarization is performed for each "eNB ID" 317 of the NW information. In a case where summarization is performed for each S-GW 104, "S-GW IP" 318 is converted into S-GW ID that holds the corresponding IP, and summarization is performed for each S-GW ID. Alternatively, the eNB ID may be converted into S-GW ID, network interface card (NIC) ID, or I/F ID of S-GW using topology information of a RAN, and summarization may be performed for each S-GW ID, each NIC ID of S-GW, and each I/F ID of S-GW.

The flow summarizing program 243 has a lookup table containing a matching relationship for conversion from S-GW IP to S-GW ID, NIC ID of S-GW, I/F ID of S-GW or conversion from S-GW P and eNB ID to S-GW ID, NIC ID of S-GW, I/F ID of S-GW as necessary. Similarly, the flow summarizing program 243 has a lookup table containing a matching relationship for conversion from P-GW IP to P-GW ID, NIC ID of P-GW, I/F ID of P-GW or conversion from P-GW IP and eNB ID to P-GW ID, NIC ID of P-GW, and I/F ID of P-GW.

When the flow summarization is performed, validity of the measurement target list 400 may be checked. The validity check of the measurement target list is a process of checking whether or not service quality is constant. Specifically, the validity check includes steps 504 to 506 regarding the flow extraction condition generating process. That is, it is checked again whether or not ("Server_IP", "Server_Port") satisfies the extraction condition, and a service that does not satisfy the condition is excluded. Therefore, it is possible to exclude an influence such as quality degradation caused by server malfunction.

FIG. 6 is an exemplary communication quality table 600 held by the quality management server. The communication quality table 600 contains an "ID" column 601, an "evaluation condition" column 602, an "evaluation result" column 603, and a "number of corresponding flows" column 604. The "ID" column 601 stores an identifier for uniquely identifying an entry. The "evaluation condition" column 602 contains a "measurement start time" 611, a "measurement period" 612, an "evaluation site" 613, and an "evaluation item" 614. The "measurement start time" 611 and the "measurement period" 612 store time for obtaining communication quality. The "evaluation site" 613 stores which communication path is used to obtain the communication quality. The "evaluation item" 614 stores an evaluation item regarding which of a file transfer time or a throughput is used in evaluation. The "evaluation result" 603 stores a distribution of the statistic information of the flow satisfying the "evaluation condition" 602. According to the present embodiment, as a statistic value representing a distribution, a minimum value 621, a first quartile (¼) point 622, a center (½) value 623, a second quartile (¾) point 624, and a maximum value 625 are stored. Alternatively, a value serving as a reference of evaluation such as a 95% value may be additionally stored. The "number of corresponding flows" column 604 stores the number of flows satisfying the evaluation condition.

The communication quality information transmitting program 244 is operated in response to receipt of a request for the communication quality information sent from the operational terminal 108. The request from the operational terminal 108 contains a point to be visualized, specifically, the measurement start time, the measurement period, the evaluation site, and the evaluation item, and the like as indicated by the "evaluation condition" column 602. The quality management server 107 searches the communication quality table 600 and transmits the "evaluation result" 603 satisfying the "evaluation condition" 602 or the "number of corresponding flows" 604 to the operational terminal 108. Alternatively, layout information for displaying on the operational terminal 108 and the like may also be transmitted to the operational terminal 108.

Finally, a process in the operational terminal will be described. Basically, the operational terminal is operated in response to operation by an administrator. The operational terminal transmits a request to the quality management server 107 depending on a request from an administrator. In addition, the "evaluation condition" 602, the "evaluation result" 603, and the "number of corresponding flows" 604 received from the quality management server 107 are displayed on a display unit (I/O device 214) and visualized as a graph or arranged based on the layout information and are displayed on the display unit.

FIG. 8 is a display example of the communication quality information displayed on the display unit of the operational terminal 108.

The information regarding the "evaluation condition" 602 and the "evaluation result" 603 satisfying the evaluation condition are displayed. The "evaluation result" 603 may be displayed as a graph or a list. In this example, the "evaluation result" 603 is displayed as a graph.

Figure 8A:
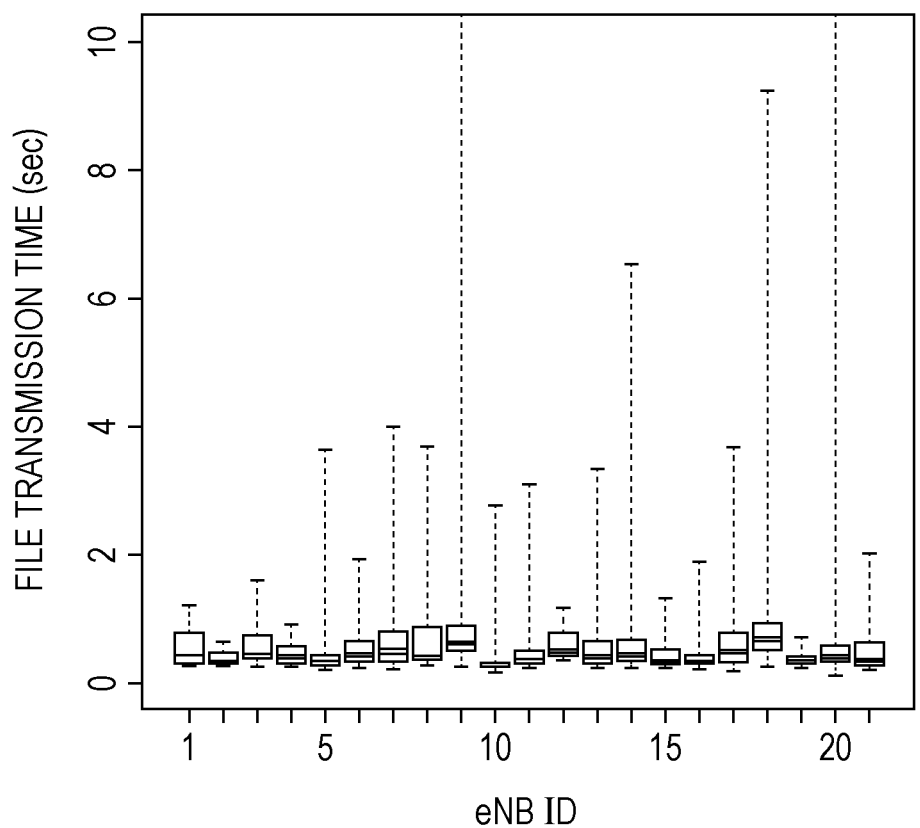
FIG. 8A illustrates a display example of communication quality information displayed on a display unit of the operational terminal.

FIG. 8A is a display example obtained when an administrator selects a plurality of base stations (eNB1 to eNB21) as an evaluation site and selects web acquisition quality as the evaluation item. In this example, a start time of 2012/01/01 10:11:10.000 and data for a measurement period of 300 sec. are displayed.

In the graph of the "evaluation result" 603, the abscissa denotes eNB ID as an evaluation site, and the ordinate denotes a file transfer time. In this example, a distribution of the statistic information obtained as the evaluation result is visualized using a box plot. For example, in a case where there is an index serving as a reference such as a 95% value, only such a value may be displayed. Alternatively, a combination of statistic values for each eNB obtained using other means may be displayed on a graph. For example, the statistic values for each eNB obtained using other means may include a value representing a status of a base station such as a band occupation rate, a CPU utilization rate, the number of accessed UEs, the number of flows, and the like.

As illustrated in FIG. 8A, since communication quality for each base station is evaluated using information close to a value actually sensed by a user such as a file transfer time (web acquisition quality), it is possible to allow an operator to intuitively recognize a base station having bad quality. In addition, in order to more simply recognize a base station having bad quality, sorting may be performed to display base stations in the order of a lower statistic value. As a statistic value compared in the sorting, an index considered as important is selected from the "evaluation result" 603 of the communication quality table, and is held in a setup file and the like in advance.

Figure 8B:
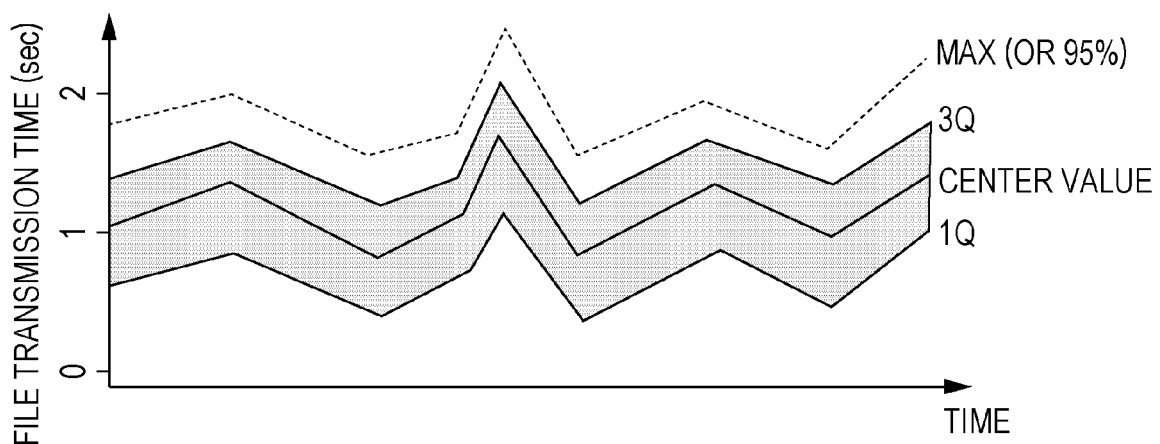
FIG. 8B illustrates a display example of communication quality information displayed on a display unit of the operational terminal.

FIG. 8B illustrates a display example when an administrator selects eNB1 as an evaluation site, selects web acquisition quality as an evaluation item, and selects a plurality of measurement periods. In this example, a plurality of data is displayed by setting the start time to 2012/01/01 0:0:0.000, the end time to 2012/01/31 23:59:59.000, and the measurement period to 300 sec. In the graph of the evaluation result, the abscissa denotes time, and the ordinate denotes a file transfer time. In addition, as described above, time-series statistic information obtained by other means for the corresponding base station may be displayed in combination.

An administrator can change the evaluation condition by changing a corresponding portion displayed using a graphic user interface (GUI). In a case where the evaluation condition is changed, the operational terminal displays the evaluation result based on the newly requested evaluation condition by transmitting the evaluation condition to the quality management server.

Smooth operation can be made by selecting an area where eNB ID or a statistic value thereof is displayed from FIG. 8A and transitioning the area to a corresponding portion of FIG. 8B.

As described above, according to the present embodiment, a flow appropriate to measurement of communication quality is extracted, and the communication quality for each communication path is evaluated based on the extracted flow. As a result, a network operator as an administrator can recognize a network status with high accuracy using communication quality information close to a value actually sensed by a user such as a file transfer time or a throughput. Accordingly, it is possible to alleviate a work load of a network operator who visits a local site and performs a check based on a test packet in the related art. In addition, since a network status is checked in detail, a feedback can be rapidly made to design or set the network.

Second Embodiment

A second embodiment of the present invention will now be described. The second embodiment is different from the first embodiment in a place to hold a measurement target list 400 and a portion where a flow extraction condition generating program 242 is integrated. The first embodiment relates to an example in which a quality management server 107 has a flow extraction condition generating program 242, and a measurement target list 400 is generated in a quality management server. According to the second embodiment, the flow extraction condition generating program 242 is integrated into a flow measurement server 106, and the measurement target list 400 is created in the flow measurement server.

In a case where the flow measurement server 106 holds the measurement target list, automatic transmission to the quality management server may be performed at the timing that a flow serving as a measurement target is terminated (when a TCP session is terminated).

Since the flow extraction condition generating program 242 is provided in the flow measurement server 106, it is possible to reduce data exchange between the quality management server and the flow measurement server relating to a flow extraction condition generating process and a load applied to each device.

As an intermediate method between the first embodiment and the aforementioned method, a flow extraction condition generating program 242 may be provided in the quality management server, and the created measurement target list 400 may be transmitted to the flow measurement server.

Although description has been made by assuming that the flow measurement server is different from the quality management server, such functionalities may be implemented in a single device.

Other devices and functionalities are similar to those of the first embodiment, and description thereof will not be repeated.

Third Embodiment

A third embodiment of the present invention will be described with reference to FIG. 9. The third embodiment is different from the first and second embodiments in a method for obtaining traffic information in the flow measurement server 106. In the first and second embodiments, the flow information of overall traffic flowing through the P-GW 105 is obtained and managed using the flow measurement server. However, since a traffic amount flowing through the RAN 110 is enormous, the cost of the flow measurement server 106 becomes expensive in order to collect information on overall flows. According to the present embodiment, there is provided an example for decreasing a device cost and a processing load of the flow measurement server 106.

Figure 9:
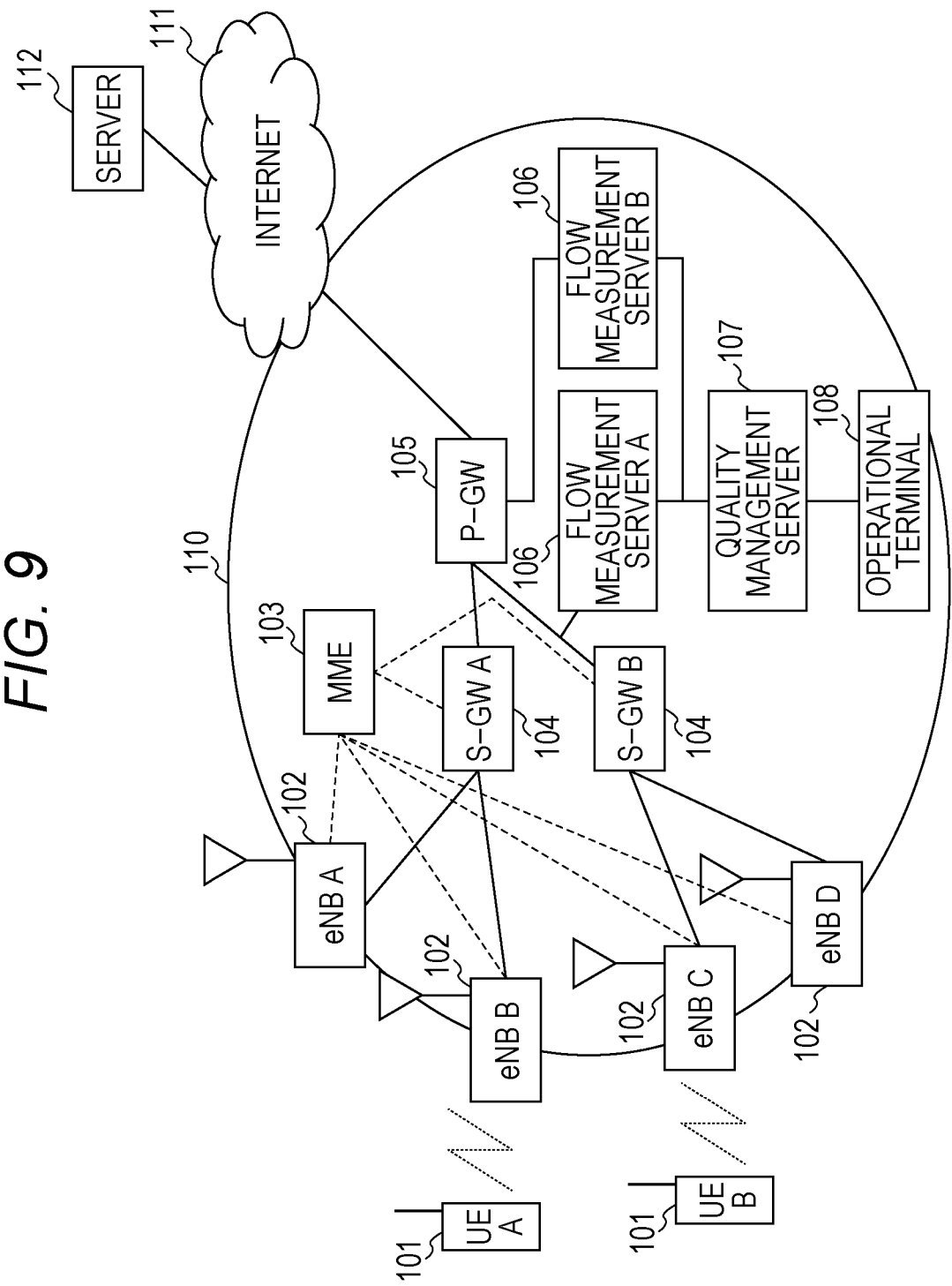
FIG. 9 is a schematic configuration diagram illustrating an exemplary mobile communication system according to a third embodiment.

FIG. 9 is a diagram illustrating a configuration of the mobile communication system according to the third embodiment. In this configuration, for example, a plurality of flow measurement servers, i.e. a flow measurement server A 106 and a flow measurement server B 106, are provided. The flow measurement server A 106 processes traffic of the P-GW 105 and the S-GW B104, and the flow measurement server B 106 processes traffic of the P-GW 105 and the S-GW A 104. The flow measurement server A 106 is connected to the network tap by arranging the network tap in a link between the P-GW 105 and the S-GW B 104. In addition, overall traffic flowing between the P-GW 105 and the S-GW B 104 is received through mirroring of the network tap. The flow measurement server B 106 is connected to the P-GW 105 and receives the mirroring from the P-GW 105.

According to the present embodiment, policy mirroring is employed, in which a condition for mirroring a packet is assigned to the mirroring from the P-GW 105 to the flow measurement server B. That is, by setting an extraction condition of a measurement target list 400 as this mirroring condition, it is possible to collect necessary information without sending overall traffic to the flow measurement server B.

Similar to the first embodiment, the measurement target list 400 is created based on the flow information collected by the flow measurement server A 106. In addition, by transmitting the extraction condition contained in the created measurement target list 400 to the P-GW, the extraction condition is set as a condition of policy mirroring of the P-GW 105.

Using this method, it is possible to remarkably reduce the traffic information sent from the P-GW 105 to the flow measurement server B 106 from overall traffic flowing between the P-GW 105 and the S-GW A 104 to only traffic of the flow satisfying the condition of the measurement target list.

It is possible to obtain the flow information without duplicating between the flow measurement servers A 106 and B 106 by assigning an interface I/F connected to the S-GW A 104 in the condition of the policy mirroring of the P-GW. In this case, the quality management server 107 queries both the flow measurement servers A and B when the flow information is obtained.

In a case where there is no policy mirroring functionality in the P-GW 105, the extraction target may be selected in the flow measurement server B 106 side. That is, overall traffic between the P-GW 105 and the S-GW A 104 is mirrored to the flow measurement server B 106 using the P-GW 105 based on typical port mirroring. The flow measurement server B 106 simplifies the processing by dropping traffic not contained in the measurement target list 400 without processing anything. In a case where this method is used, the flow measurement server B 106 may receive mirroring from the network tap arranged between the P-GW 105 and the S-GW A 104.

Fourth Embodiment

A fourth embodiment of the present invention will be described with reference to FIG. 10. In this embodiment, bandwidth control to limit a network throughput is applied to a UE 101 in a network side. In this embodiment, it is assumed that a network throughput limitation is applied only to a specific UE to provide a communication service.

In this case, it may be erroneously determined that communication quality from the flow information generated by the UE 101 with the bandwidth control is bad. That is, in a case where quality of a communication path is evaluated, it is requested to exclude an influence of the UE 101 with the bandwidth control. In order to exclude an influence of the UE 101 with the bandwidth control, a UE attribute list of FIG. 10 is employed.

FIG. 10 is a diagram illustrating an exemplary UE attribute list held by a quality management server according to the fourth embodiment. The UE attribute list contains an "ID" column 1101, an "imsi" column 1102, and a "class" column 1103. Here, in the "class" column 1103, for example, as an attribute of UE 101, a class "a" is assigned to a typical UE, and a class "b" is assigned to the UE with the bandwidth control.

An influence of the UE 101 with the bandwidth control is expressed in an "extraction condition" 402 of the measurement target list 400 and an "evaluation result" 603 of a communication quality table 600. In this regard, a process of excluding the influence is added to a process of creating the measurement target list 400 and a process of creating the communication quality table 600.

In the process of creating the measurement target list 400, it is possible to remove an influence by excluding the flow for the UE with the bandwidth control, that is, the flow corresponding to the "imsi" having a class "b" in the UE attribute list in step 503 regarding a flow extraction condition generating process. Similarly, in the process of creating the communication quality table 600, it is possible to also remove an influence by excluding the flow for the UE with the bandwidth control when the flow summarization is performed using a flow summarizing program 243. Determination on whether or not the UE has a controlled bandwidth may be processed using a bloom filter (BF) and the like.

While the embodiments of the present invention have been described hereinbefore, they are not intended to limit the invention. Those skilled in the art would appreciate that each embodiment may be variously modified or changed, or a combination thereof may also be possible.

What is claimed is:

1. A communication system comprising:
   a mobile terminal communicating over a network with a server;
   a flow measurement server between the mobile terminal and the server;
   a quality management server coupled to the flow measurement server,
   wherein the flow measurement server computes a plurality of items of communication quality for each flow based on data flowing between the mobile terminal and the server,
   wherein the quality management server extracts a predetermined flow, summarizes the extracted flow for each communication path, and outputs a distribution of the communication quality for the each communication path, and
   wherein the quality management server extracts the predetermined flow by sorting flows based on an IP address of the server and an L4 port number and selecting a set of the IP address and the L4 port number corresponding to the sorted flows having an average and a variance of the communication quality included in a predetermined range.

2. The communication system according to claim 1, wherein one of the items of communication quality is a flow duration time.

3. The communication system according to claim 1, wherein one of the items of communication quality is time necessary to receive a predetermined number of packets or a predetermined number of bytes.

4. The communication system according to claim 1, wherein one of the items of communication quality is network throughput.

5. The communication system according to claim 1, further including an operational terminal, wherein the quality management server outputs, to the operational terminal, a distribution of the communication quality in a measurement period contained in a request from the operational terminal.

6. The communication system according to claim 1, wherein the quality management server extracts at least one of a flow having time necessary to receive a predetermined number of packets or a predetermined number of bytes and a flow for downloading data equal to or smaller than a predetermined number of packets or a predetermined number of bytes when the communication quality is evaluated using a file transfer time.

7. The communication system according to claim 1, wherein the quality management server extracts a flow having the number of packets or the number of bytes greater than a predetermined value when the communication quality is evaluated using a network throughput.

8. The communication system according to claim 1, wherein the flow measurement server includes a first flow measurement server and a second flow measurement server,
   the first flow measurement server extracts a flow extraction condition based on the data flowing from a first gateway to a second gateway, and
   the second flow measurement server receives data transmitted by causing the second gateway to perform policy mirroring for a flow matching the flow extraction condition.

9. The communication system according to claim 1, wherein the flow measurement server and the quality management server are implemented in a single device.

10. A communication system comprising:
    a mobile terminal communicating over a network with a server;
    a base station wirelessly connected to the mobile terminal;
    a first gateway connected to the base station;
    a second gateway connected to the first gateway;
    a flow measurement server connected to the second gateway;
    a quality management server connected to the flow measurement server; and
    an operational terminal connected to the quality management server,
    wherein the flow measurement server computes a plurality of items of communication quality for each flow based on data flowing between the mobile terminal and the server,
    wherein the quality management server extracts a predetermined flow and summarizes the extracted flow for each communication path,
    wherein the quality management server extracts the predetermined flow by sorting flows based on an IP address of the server and an L4 port number and selecting a set of the IP address and the L4 port number corresponding to the sorted flows having an average and a variance of the communication quality included in a predetermined range, and
    wherein the operational terminal displays a distribution of the communication quality for the each communication path.

11. The communication system according to claim 10, wherein one of the items of the communication quality includes at least one of a flow duration time, time necessary to receive a predetermined number of packets or a predetermined number of bytes, and a network throughput.

12. The communication system according to claim 10, wherein the quality management server extracts at least one of a flow having time necessary to receive a predetermined number of packets or a predetermined number of bytes and a flow for downloading data equal to or smaller than a predetermined number of packets or a predetermined number of bytes when the communication quality is evaluated using a file transfer time.

13. The communication system according to claim 10, wherein the quality management server extracts a flow having the number of packets or the number of bytes greater than a predetermined value when the communication quality is evaluated using a network throughput.

14. A communication system comprising:
a mobile terminal communicating with a server;
a base station coupled to a network;
a gateway through which data passes to outside of said network;
a flow measurement server connected to the gateway;
a quality management server coupled to the flow measurement server,
wherein the flow measurement server computes a plurality of items of communication quality for each flow based on data passing through the gateway,
wherein the quality management server extracts a predetermined flow, summarizes the extracted flow, and outputs a distribution of the communication quality for each communication path based on the extracted flow, and
wherein the quality management server extracts the predetermined flow by sorting flows based on an IP address of the server and an L4 port number and selecting a set of the IP address and the L4 port number corresponding to the sorted flows having an average and a variance of the communication quality included in a predetermined range.

15. The communication system according to claim 14, wherein one of the items of communication quality is a flow duration time.

16. The communication system according to claim 14, wherein one of the items of communication quality is time necessary to receive a predetermined number of packets or a predetermined number of bytes.

17. The communication system according to claim 14, wherein one of the items of communication quality is network throughput.

18. The communication system according to claim 14, further including an operational terminal, wherein the quality management server outputs, to the operational terminal, a distribution of the communication quality in a measurement period contained in a request from the operational terminal.

* * * * *